United States Patent [19]

Roberts

[11] Patent Number: 4,668,120
[45] Date of Patent: May 26, 1987

[54] SOLAR-POWERED ILLUMINATED REFLECTOR

[76] Inventor: John C. Roberts, 1919 N. 77th Ave., Elmwood Park, Ill. 60635

[21] Appl. No.: 789,330

[22] Filed: Oct. 21, 1985

[51] Int. Cl.$^4$ ............................................. E01F 11/00
[52] U.S. Cl. ......................................... 404/12; 404/16
[58] Field of Search ....................... 404/12, 13, 14, 15, 404/16; 350/97, 101, 452; 116/63 R

[56] References Cited

U.S. PATENT DOCUMENTS

| | | | |
|---|---|---|---|
| 1,708,108 | 4/1929 | Rolph | 116/63 R |
| 2,246,098 | 6/1941 | Jaeckel | 350/452 |
| 2,308,525 | 1/1943 | Lowe | 404/11 |
| 3,257,552 | 6/1966 | Converso | 404/15 X |
| 4,050,834 | 9/1977 | Lee | 404/16 |
| 4,070,095 | 1/1978 | Suhr | 404/12 X |
| 4,358,217 | 11/1982 | Stone | 404/16 |

Primary Examiner—Stephen J. Novosad
Assistant Examiner—Matthew Smith
Attorney, Agent, or Firm—Mason, Kolehmainen, Rathburn & Wyss

[57] ABSTRACT

A self-contained solar-powered illuminated reflector provides improved visibility at a distance as a traffic safety aid. A housing adapted to be secured to a highway or alternatively, to a vertical wall, encloses a reflector for reflecting light in a predetermined direction toward highway traffic, a light source, a battery and a photovoltaic system. The housing includes a window member for transmitting light outward from the light source in the predetermined direction toward highway or pedestrian traffic. An optical lightguide between the light source and the window member focuses the light from the light source so that the visible effectiveness of the light source is optimized. Circuitry is provided for selectively enabling the operation of the light source for minimizing the power requirement to extend the useful life performance of the traffic marker. The illuminated reflector is arranged to provide maintenance free and fail-safe operation over its useful life.

20 Claims, 7 Drawing Figures

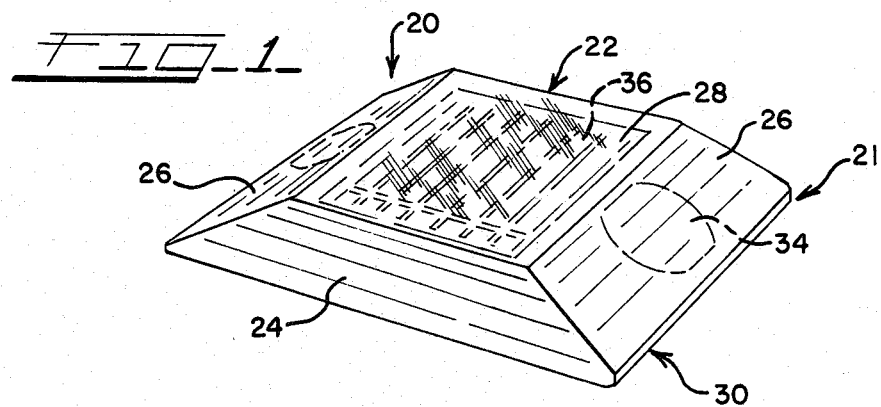
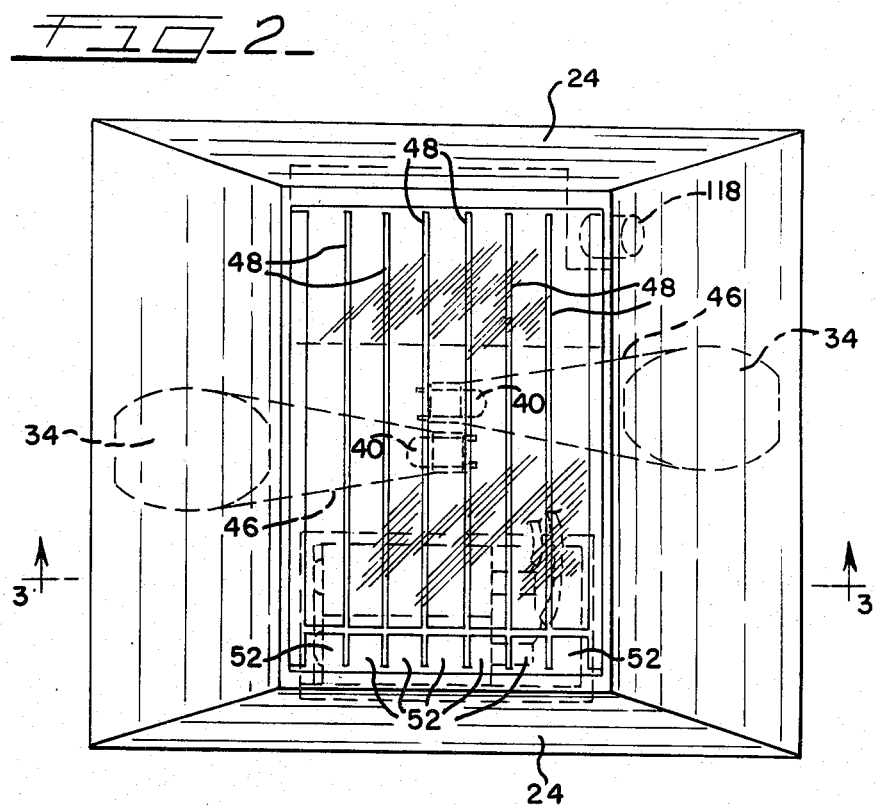
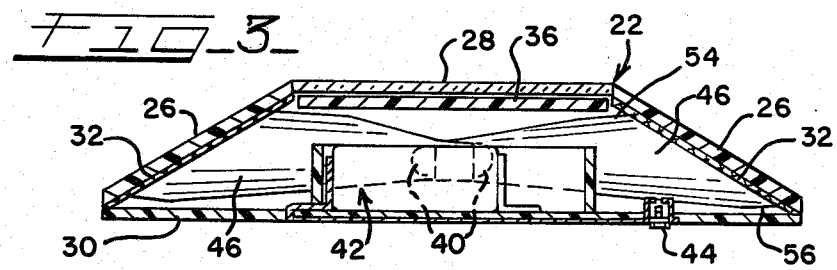

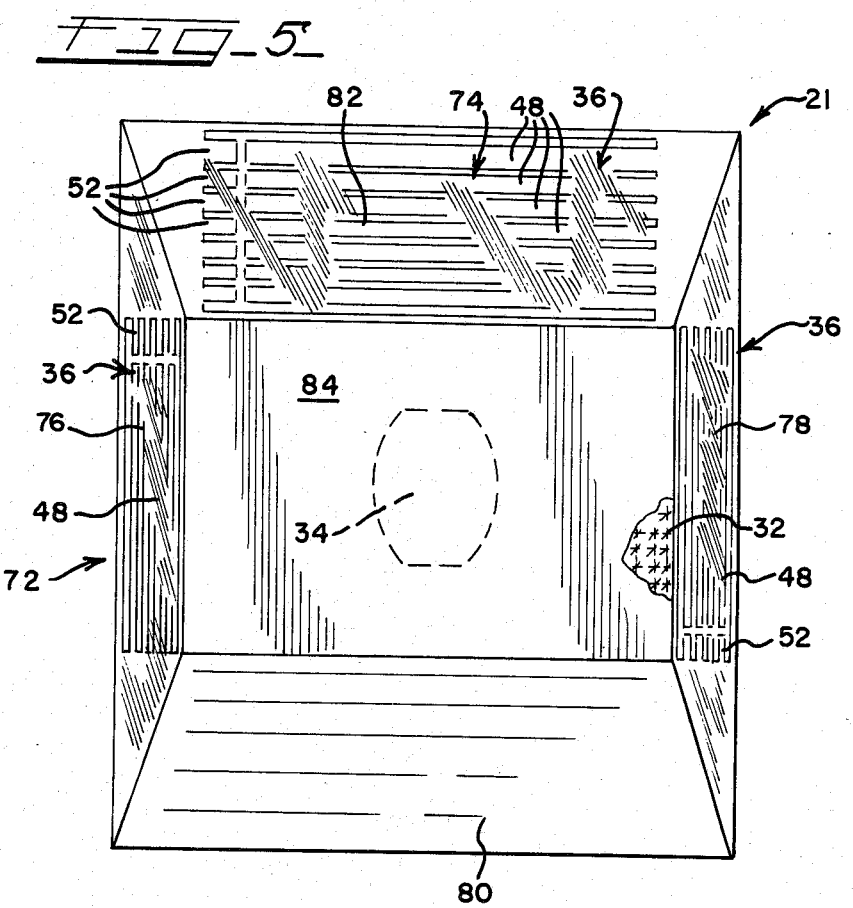
FIG_5
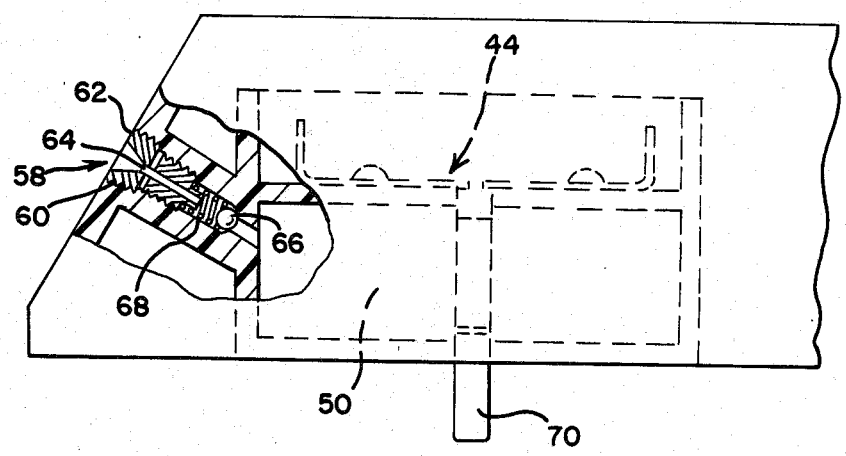
FIG_4

SOLAR-POWERED ILLUMINATED REFLECTOR

BACKGROUND OF THE INVENTION

The present invention generally relates to reflectors that are used for highway traffic markers, delineators and safety devices and, more particularly, to illuminated reflectors having a photovoltaic power source.

Reflectors for highway traffic markers, delineators, and other safety devices may be color coded and illuminated reflectors may be used to delineate highway traffic lanes, roadway edges, intersections, pedestrian crossings, pillars, posts, barricades, support columns, entry and exit ramps, and the location of fire hydrants. Illuminated reflectors may be used as safety devices such as on guard rails and crash cushion barriers. The illuminated reflector may be installed on the road at intersections indicating the presence of a "Stop" sign.

In addition to its use as a highway traffic marker and safety device, illuminated reflectors may be used in residential, industrial, institutional, and marine applications, such as in: marking steps or the presence of stairways in homes, hospitals, schools, plants, and offices; indicating safe walkways in plants and laboratories; marking marine buoy and pier locations; and marking entrance and exit paths, driveways, and parking locations. Illuminated reflectors may be used to mark locations of buried cable, water and gas pipelines, fire fighting hoses and water control valves, industrial control valves and other related applications.

U.S. Pat. No. 3,332,327, issued July 25, 1967, discloses a roadway traffic marker that includes a cube-corner reflex reflective optical system in which the cube axes of the cube-corner reflective elements are inclined so as to be substantially coincidental with the nominal incoming refracted ray. Additionally, that disclosed pavement marker includes a front face inclined at a predetermined angle to the roadway surface allowing the front face to be wiped clean by contact with vehicle tires.

Examples of other pavement markers are disclosed in U.S. Pat. Nos. 4,232,979, issued Nov. 11, 1980 and U.S. Pat. No. 4,340,319, issued July 20, 1982.

A problem with such highway markers and reflectors is that they are passive devices that provide roadway markings visible from oncoming traffic solely as a result of their ability to reflect light. It is highly desirable to provide a reflector that includes a light source so that the highway traffic reflectors and delineators are clearly visible and are visible over an extended distance beyond the range of a vehicle's headlamps by a driver of the vehicle. Additionally, it is highly desirable to provide an illuminated highway traffic reflector that includes a photovoltaic power system for charging a battery and extending the maintenance-free life performance of the traffic marker and that provides fail-safe operation.

SUMMARY OF THE INVENTION

An object of the present invention is to provide a new and improved traffic marker and illuminated reflector.

Another object of the present invention is to provide a new and improved traffic marker and illuminated reflector having improved visibility.

Another object of the present invention is to provide a new and improved traffic marker producing highly visible indication with or without reflected light.

A further object of the present invention is to provide a new and improved traffic marker and illuminated reflector having an internal light source, a battery in circuit with the light source and a photovoltaic power system for charging the battery.

Briefly, the present invention relates to an illuminated reflector and highway traffic marker including a housing adapted to be secured to a highway pavement or alternatively, to be secured to a vertical surface or wall and, at least one reflector element being positioned within the housing and arranged to reflect light toward highway traffic. A light source within the housing provides improved visibility and increases the effectiveness of the traffic marker. The housing includes a window member or lens for transmitting light outward from the light source in a predetermined direction toward highway traffic. A photovoltaic power system for charging a battery extends the useful life performance of the traffic marker and illuminated reflector. Circuitry is provided for selectively enabling the operation of the light source for minimizing the power requirements to further extend the useful life performance of the traffic marker and illuminated reflector. The traffic marker is arranged to provide maintenance free operation over the extended useful life of the device.

In accordance with an important feature of the invention, an optical lightguide device between the light source and the window member focuses the light from the light source so that the visible effectiveness of the light source is optimized. The optical lightguide is an integral member having a generally conical shape with the interior having reflective characteristics.

BRIEF DESCRIPTION OF THE DRAWING

The above and other objects and advantages and novel features of the present invention will become apparent from the following detailed description of the preferred and alternative embodiments of the traffic marker illustrated in the accompanying drawing, wherein:

FIG. 1 is a perspective view of a traffic marker constructed in accordance with the teachings of the invention;

FIG. 2 is an enlarged, top plan view of the device of FIG. 1, portions being deleted to show interior details and having other interior details shown in dotted lines;

FIG. 3 is an enlarged, cross-sectional view of the device of FIG. 1 taken along line 3—3 of FIG. 2;

FIG. 4 is an enlarged, fragmentary crosssectional view illustrating a battery venting arrangement of the device of FIGS. 1 and 5;

FIG. 5 is a prespective view of an alternative embodiment of a traffic marker constructed in accordance with the teachings of the invention;

DETAILED DESCRIPTION OF THE PREFERRED EMBODIMENT

Figure 6:
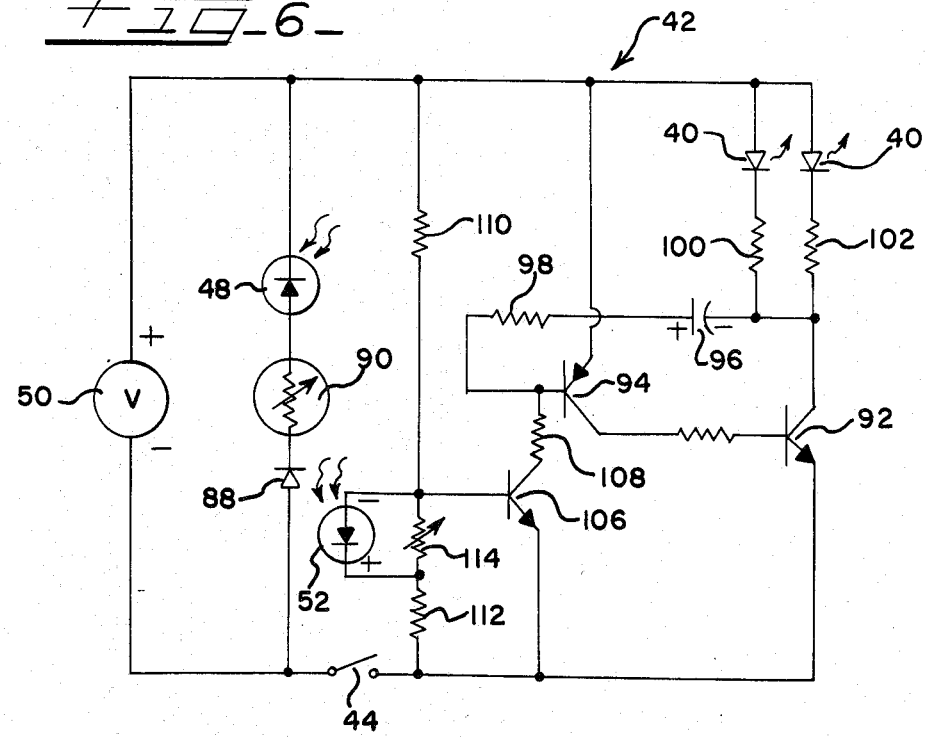
FIG. 6 is an electrical schematic diagram of the control circuitry for the device of FIGS. 1 and 5.

Referring to the drawing and initially to FIGS. 1–4, there is illustrated a new and improved illuminated reflector 20 constructed in accordance with the principles of the present invention. The illuminated reflector 20 is described as a highway traffic marker 20, although useful for various other highway safety applications and for the above listed industrial, institutional, residential and marine applications. A housing 21 for the traffic marker 20 includes a top shell 22 having sidewalls 24 and 26 and a top wall 28, and a base plate 30. A light-transmitting synthetic resin preferably is used to form both the top shell 22 and the base plate 30 conveniently by molding. The top wall 28 and the base plate 30 have a rectangular shape. The base plate dimensionally is larger than the top wall 28, and the sidewalls 24 and 26 have a trapezoidal configuration. The opposite sidewalls 26 are acutely inclined with respect to a generally horizontal base surface 30 of the traffic marker 20 allowing the sidewalls 26 to be periodically wiped clean by contact with vehicle tires. A plurality of reflector elements 32 and a window member 34 are formed in the opposite sidewalls 26, for example, by molding. The reflector elements 32 are arranged in an array within the inclined sidewalls 26 for reflecting light to the direction of oncoming traffic. The reflector elements 32 advantageously may be of the type and arrangement disclosed in the above-mentioned U.S. Pat. No. 3,332,327. The disclosure of U.S. Pat. No. 3,332,327 is incorporated by reference herein.

A clear, light-transmitting material, such as the material sold under the trademark Plexiglas or reinforced fiberglass, preferably forms the window 34. Opposite faces of the window 34 may be generally parallel or curved in the form of a lens for focusing the light.

As its major internal components, the traffic marker 20 includes a photovoltaic power system 36, a pair of light sources 40, control circuitry 42 (FIGS. 6 and 7), a circuit enable switch 44 for activating the control circuitry when the traffic marker 20 is installed and a pair of optical lightguide devices 46 for guiding the light from light sources 40 to the windows 34. A first plurality of solar cells 48 of the photovoltaic power system 36 are connected in series for charging a battery 50. The photovoltaic power system 36 further may include a second plurality of solar cells 52 for inhibiting the light sources 40 during daylight. The photovoltaic power system 36 may be about 1½"×3".

The light sources 40 preferably are light emitting diodes (LED's) that emit optical radiation in the visible regions. Alternatively, an incandescent lamp may be used for the light sources 40. The windows or lens 34 may be of plastic or glass material and optionally colored when used with the alternative incandescent light source 40.

The optical lightguide devices 46 extend between the light sources 40 and the windows 34 for guiding the light outward from the light sources 40. Each of the optical lightguide devices 46 has a generally conical configuration. A flattened top end portion 54 and a flattened bottom end portion 56 minimizes the space requirement of the lightguide devices 46 without resulting in significant loss in focusing of the light from the LED 40. The windows 34 are configured corresponding to the mating end configuration of the lightguide devices 46 and are glued or epoxied in sealed physical engagement with the lightguide devices 46. Conveniently, each of the optical light-guide devices 46 may be formed by a single molding from a synthetic resin or plastic material. An interior surface of the lightguide devices 46 may be coated with aluminum or other light reflective material.

A positive pressure venting assembly 58 provides for venting of the battery 50 and enables watertight operation of the highway traffic marker 20. A battery gas venting channel 60 receives a rubber plug member 62 that has an opening 64 provided through the length of the plug member 62. A cylindrical member or ball 66 that is spring loaded by a spring 68 provides positive pressure venting of the battery gas through the opening 64 to the exterior of the housing 21 and prevents water from entering the housing 21. Alternatively, a polyurethane member or insert may be used instead of the venting assembly 58 for venting battery gas.

When the traffic marker 20 is assembled with the control circuitry 42 in the housing 21, the top shell 22 is filled with a thermosetting potting compound and a filler such as glass beads or silica to provide mechanical strength and reinforcement of the traffic marker 20. Then the base plate 30 is mechanically secured to the top shell 22, for example, by an epoxy or welding. The optical lightguide devices 46 are air filled and may function in conjunction with window 34 to provide a Fresnel lens construction.

The circuit enable switch 44 is disposed in the horizontal base surface 30 and closes a circuit path in the control circuit 42 when the traffic marker 20 is installed, for example when the marker 20 is adhesively secured to a highway pavement. The switch 44 includes a switch rod 70 that engages the pavement surface and is moved upwardly to close the circuit path. Discharging of the battery 50 before the traffic marker 20 is installed is prevented by the circuit enable switch 44.

Referring now to FIG. 5, there is shown an alternative embodiment of an illuminated reflector 72 constructed in accordance with the principles of the invention. The same reference characters are used for similar components of the markers of FIGS. 1 and 5. The illuminated reflector or traffic marker 72 is arranged for use on a vertical surface or wall of various safety devices provided along the side of a highway, such as on guard rails, delineators, lane separators, crash cushions or barriers. The housing 21 of the traffic marker 72 includes a base plate (not shown) for mounting engagement with the vertical surface or wall of the safety device and a top shell 74. The top shell 74 includes side walls 76 and 78, a bottom wall 80, a top wall 82 and a rectangular front wall 84. The reflective elements 32 are arranged in an array within the front wall 84. The window 34 is provided within the front wall 84. The optical light guide device 46 extends between the light source 40 and the window 34. Alternatively, two windows 34 can be provided within the front wall 84 with two light guide devices 46 extending between the light sources 40.

The photovoltaic power system 36 including the series connected solar cells 48 for charging the battery 50 and the series connected solar cells 52 for inhibiting the light sources 40 during daylight is disposed under the top wall 82 and the side walls 76 and 78.

Referring to FIG. 6, the control circuitry 42 for the illuminated reflectors 20 and 72 is illustrated. The control circuit 42 includes a DC power supply in the form of the battery 50, preferably a rechargeable battery such as a nickel cadmium or lithium battery, for supplying power to the LED's 40 with the circuit enable switch 44 in the closed position. A diode 88, a positive temperature coefficient (PTC) thermistor 90 and the series-connected solar cells 48 are connected in series and across the battery 50 to enable charging of the battery 50 by the solar cells 48 during daylight. The diode 88 is used to prevent the battery 50 from discharging back through the solar cells 48 during darkness. The PTC thermistor 90 provides a high impedance at a predetermined temperature, for example at 120° F., to prevent charging of the battery 50 at high ambient temperatures to avoid excessive battery outgassing. The LED's 40 are connected to the positive supply line of the battery 50 and to a flasher circuit that includes an NPN transistor 92, a PNP transistor 94, a timing capacitor 96, timing and biasing resistors 98, 100, 102 and 104 for alternately turning on and off the LED's 40.

A collector of the NPN transistor 92 is series connected to the LED's 40 via resistors 100 and 102 with an emitter of transistor 92 connected to the negative supply line of the battery 50 via the circuit enable switch 44. The LED's 40 are turned on when the transistor 92 is rendered conductive. A collector of the PNP transistor 94 is connected through the biasing resistor 104 to a base of transistor 92 with an emitter of the transistor 94 connected to the positive supply line of the battery 50. A base of the transistor 94 is connected to the series connected resistor 98 and timing capacitor 96.

An NPN transistor 106 having a collector connected through a resistor 108 to the base of the PNP transistor 94 with an emitter of the transistor 106 connected to the negative supply line of the battery 50, controls or enables the flasher circuit. With the NPN transistor 106 rendered conductive a current path is provided for charging the timing capacitor 96 through the series connected LED's 40 and resistors 100 and 102, resistors 98 and 108, and the collector-emitter junction of transistor 106. As the capacitor 96 becomes charged, a voltage potential difference across its terminals increases to a potential sufficient to bias on the transistors 94 and 92 and turn on the LED's 40. The capacitor 96 is then discharged through the conduction of transistors 94 and 92. Component values of the timing capacitor 96 and resistor 98 provide a small duty cycle, for example LED's 40 are turned on for approximately 10 milliseconds during a 500 millisecond interval. Visibility is improved by this flashing operation of the LED's 40 and the useful life of the battery 50 is increased.

A voltage divider circuit biases the NPN transistor 106 and includes series-connected resistors 110, 112 and variable resistor 114 with the solar cells 52 connected in parallel with the variable resistor 114. The series-connected solar cells 52 are connected to a base of the NPN transistor 106 as shown. In operation, when the solar cells 52 are activated during daylight, the NPN transistor 106 is rendered nonconductive so that the flasher circuit is inhibited and the LED's 40 are not turned on.

Figure 7:
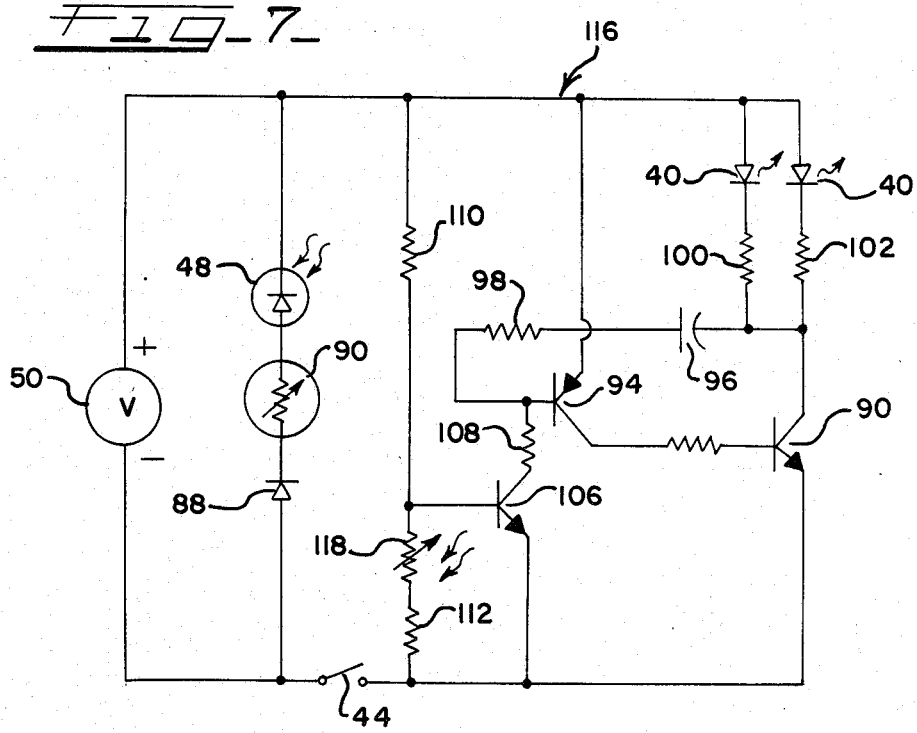
FIG. 7 is an electrical schematic diagram of an alternative embodiment of the control circuitry for the device of FIGS. 1 and 5.

Referring to FIG. 7, there is shown an alternative embodiment of the control circuitry 116 for the illuminated reflectors 20 and 72. The same reference characters are used for similar components of the circuits of FIGS. 6 and 7. In the alternative embodiment shown in FIG. 7, a light dependent resistor 118 (shown in dotted line in FIG. 2) is used instead of the parallel-connected variable resistor 114 and solar cells 52 for inhibiting the operation of the flasher circuit during daytime operation. In operation during darkness, the resistance of the light dependent resistor 118 becomes high so that the transistor 106 is held in the on condition, and the normal function of the flasher circuit is enabled. During daylight, the resistance of light dependent resistor 118 becomes low so that the transistor 106 is rendered nonconductive and the flasher circuit is disabled.

Many modifications and variations of the present invention are possible in light of the above teachings. Thus, it is to be understood that, within the scope of the appended claims, the invention may be practiced otherwise than as specifically described hereinabove.

What is claimed and desired to be secured by Letters Patent of the United States is:

1. A highway traffic marker comprising:
   a housing adapted to be secured to a highway;
   a reflector in said housing for reflecting light in at least one predetermined direction toward highway traffic;
   at least one light source in said housing;
   a battery in circuit with said light source;
   a photovoltaic system in said housing for charging said battery;
   said housing including window means for transmitting light from said light source outward from said housing in said predetermined direction; and
   optical lightguide element mounted in said housing for guiding light from said one light source to said window means, said optical lightguide element having a generally conical shape and said window means being a Fresnel lens.

2. A highway traffic marker as recited in claim 1 wherein said light source comprises a light emitting diode.

3. A highway traffic marker as recited in claim 1 further comprising means for activating said light source dependent on ambient light radiation.

4. A highway traffic marker as recited in claim 1 wherein said photovoltaic system includes a plurality of series connected solar cells arranged for inhibiting operation of said light source responsive to photovoltaic action thereof.

5. A highway traffic marker as recited in claim 1 further comprising flasher circuit means for enabling pulsing of said light source.

6. A highway traffic marker as recited in claim 1 further including switch means for activating said circuit when the highway traffic marker is installed.

7. A highway traffic marker as recited in claim 1 further comprising a potting compound disposed within said housing.

8. An illuminated reflector comprising:
   a housing adapted to be secured to a highway;
   a reflector in said housing for reflecting light in at least one predetermined direction toward highway traffic;
   at least one light source in said housing;
   a battery in circuit with said light source;
   a photovoltaic system in said housing for charging said battery;
   said housing including window means for transmitting light from said light source outward from said housing in said predetermined direction;
   optical lightguide means for guiding light from said light source to said window means, said optical lightguide means having a generally conical shape;
   means for selectively activating said light source; and
   switch means for activating said circuit when said illuminated reflector is installed.

9. An illuminated reflector as recited in claim 8 wherein said housing is formed of light-transmitting material.

10. An illuminated reflector as recited in claim 8 wherein said photovoltaic system is disposed near a top wall of said housing.

11. An illuminated reflector as recited in claim 8 wherein said photovoltaic power system further includes a plurality of series-connected solar cells arranged for inhibiting operation of said light sources responsive to photovoltaic action thereof.

12. An illuminated reflector as recited in claim 8 wherein said light source comprises a light emitting diode.

13. An illuminated reflector as recited in claim 8 further comprising flasher circuit means for enabling pulsing of said light source.

14. An illuminated reflector as recited in claim 8 wherein said window means is a Fresnel lens.

15. An illuminated reflector comprising:
a housing adapted to be secured to a vertical member;
a reflector in said housing for reflecting light in at least one predetermined direction toward highway traffic;
at least one light source in said housing;
a battery in circuit with said light source;
a photovoltaic system in said housing for charging said battery;
said housing including window means for transmitting light from said light source outward from said housing in said predetermined direction, said window means being a Fresnel lens;
optical lightguide means for guiding light from said light source to said window means, said optical lightguide means having a generally conical shape;
means for selectively activating said light source; and
switch means for activating said circuit when said illuminated reflector is installed.

16. An illuminated reflector as recited in claim 15 wherein said housing is formed of light-transmitting material.

17. An illuminated reflector as recited in claim 15 wherein said photovoltaic system is disposed near a top wall and at least one side wall of said housing.

18. An illuminated reflector as recited in claim 15 wherein said photovoltaic power system further includes a plurality of series-connected solar cells arranged for inhibiting operation of said light sources responsive to photovoltaic action thereof.

19. An illuminated reflector as recited in claim 15 wherein said light source comprises a light emitting diode.

20. An illuminated reflector as recited in claim 15 further comprising flasher circuit means for enabling pulsing of said light source.

* * * * *